United States Statutory Invention Registration [19]

[11] Reg. Number: H957

Borck et al. [43] Published: Aug. 6, 1991

[54] HIGH-TEMPERATURE THERMAL INSULATION QUILTS

[76] Inventors: Sieg Borck, 435 Venus, Thousand Oaks, Calif. 91360; Paul M. Chewey, 1085 Golden Way, Los Altos, Calif. 94024; Robert M. Fingerhut, 340 Rio Verde Pl., #4, Milpitas, Calif. 95035; Sheldon Hyman, 1890 Tahiti Dr., Costa Mesa, Calif. 92626; Orlando A. Tafoya, 3403 Poinsettia Ave., Manhattan Beach, Calif. 90266; Bradley D. Wisneskie, 3 Porter, Irvine, Calif. 92720

[21] Appl. No.: 629,860

[22] Filed: Dec. 18, 1990

[51] Int. Cl.[5] ..... B32B 17/06; B32B 19/06; B32B 7/08; B32B 18/00

[52] U.S. Cl. ..... 112/420; 112/441; 428/74; 428/76; 428/920; 428/251

*Primary Examiner*—Brooks H. Hunt

[57] ABSTRACT

A high-temperature thermal insulation quilt assemblage consisting of an inner quilt and an outer quilt, each cut according to a pattern so as to conform to the shape and wrap around an object having a surface temperature as high as 3000° F. during operation. The inner and outer quilt each include a silicic-impregnated quartz fabric case, multiple blankets of ceramic insulation material, and quartz-fiber thread cross-stitching to reduce quilt thickness. The inner quilt additionally includes a tantalum foil inserted between two blankets of ceramic insulation material, and sewn-on tie straps. The outer quilt additionally includes sewn-on lacing strips for securing outer quilt abutting edges together; the outermost surface is coated with silicone rubber.

9 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

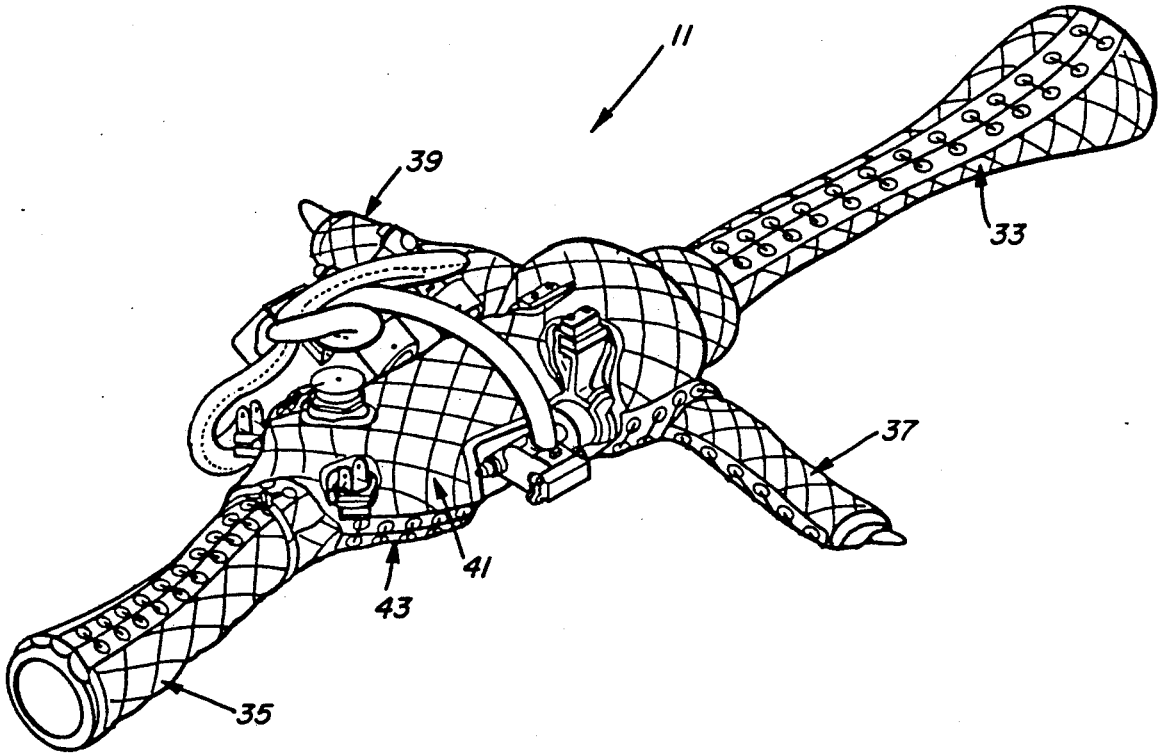

HIGH-TEMPERATURE THERMAL INSULATION QUILTS

FIELD OF THE INVENTION

The present invention relates to high-temperature thermal insulation blankets and quilts, and more particularly but without limitation thereto an assemblage consisting of a pair of high-temperature thermal insulation quilts that may be used to insulate hot objects located in the equipment section of a missile.

BACKGROUND OF THE INVENTION

The continuing requirement for higher performance missile systems necessitates subjecting gas-conducting components to higher temperatures over long periods of time. It is frequently necessary to protect other nearby missile components from the heat emanating from components operating at approximately 3000° F. temperatures, such as the heat from a hot integrated valve assembly (hereinafter designated IVA, which is used during maneuvering to control the flow of hot gases to thrust nozzles). Consequently a need exists for compact and lightweight high-temperature thermal insulation quilts for wrapping hot components. It is necessary for the insulation quilts to withstand the high temperature at the surface of the hot component, to have adequate strength, flexibility and conformability, and to not present a hazard to personnel involved in the manufacturing process.

The present invention satisifies these needs by providing an assemblage of thermal insulation quilts consisting of an inner quilt and an outer quilt, that effectively and reliably insulates high-temperature missile components from other equipment-section components that are susceptible to heat damage.

OBJECTS, FEATURES, AND ADVANTAGES

It is an object of this invention to provide a high-temperature thermal insulation assemblage of quilts suitable for wrapping items having surface temperatures of approximately 3000° F.

It is another object of this invention to provide a high-temperature thermal insulation assemblage of quilts that effectively reduces both conductive and radiant heat transfer.

It is another object of this invention to utilize only materials that are not hazardous to workers It is yet another object of this invention to provide a high-temperature thermal insulation assemblage of quilts that has adequate strength, flexibility and conformability.

It is further object is this invention to provide a high-temperature thermal insulation assemblage of quilts that is both thin and light-weight.

It is still further object of this invention to provide a high-temperature thermal insulation assemblage of quilts which closes together tightly at abutting quilt edges.

It is a feature of this invention to use quartz fabric as the material for each quilt case (i.e., the covering material forming the two sides of a quilt and the binding material around the edges).

It is another feature of this invention to use multiple blankets of ceramic insulation material within each cross-stitched quilt case.

It is yet another feature of this invention to have a thin tantalum foil inserted between two blankets of ceramic insulation material within the inner quilt case.

It is a further feature of this invention to secure abutting outer quilt edges by wiring together opposing sewn-on lacing strips.

It is an advantage of this invention that a 3000° F. temperature on the inside and an 800° F. temperature on the outside of an assemblage of quilts can be maintained by a total assemblage thickness of no more than one-half inch.

It is an advantage of this invention that the approximately one-half mil thick (i.e., 0.0005 inches thick) tantalum foil serves to reduce radiant heat transfer without adversely affecting the ability of the inner quilt to be manipulated to conform to the shape of a component.

It is an advantage of this invention that local hot spots caused by gaps between abutting quilt edges are minimized.

It is an advantage of this invention that known hazardous materials, such as asbestos, are not used in its construction.

SUMMARY OF THE INVENTION

Accordingly, the present invention relates to a high-temperature thermal insulation assemblage of quilts consisting of an inner quilt and an outer quilt, each out according to a pattern to conform to the shape of a component. The inner and outer quilts each include a silicic-impregnated quartz fabric case, multiple blankets of ceramic insulation material, and quartz-fiber thread cross-stitching to reduce quilt thickness and to keep interior insulation in place. The inner quilt additionally includes a tantalum foil inserted between two blankets of ceramic insulation material, and sewn-on tie straps. The outer quilt additionally includes sewn-on lacing strips for securing outer quilt abutting edges together; the outermost (cooler side) surface is coated with silicone rubber for wear resistance in service, and to minimize the discomfort to workers' hands when handling. The invention will be described in detail with reference to the accompanying drawings.

DESCRIPTION OF THE PREFERRED EMBODIMENT

Figure 1:
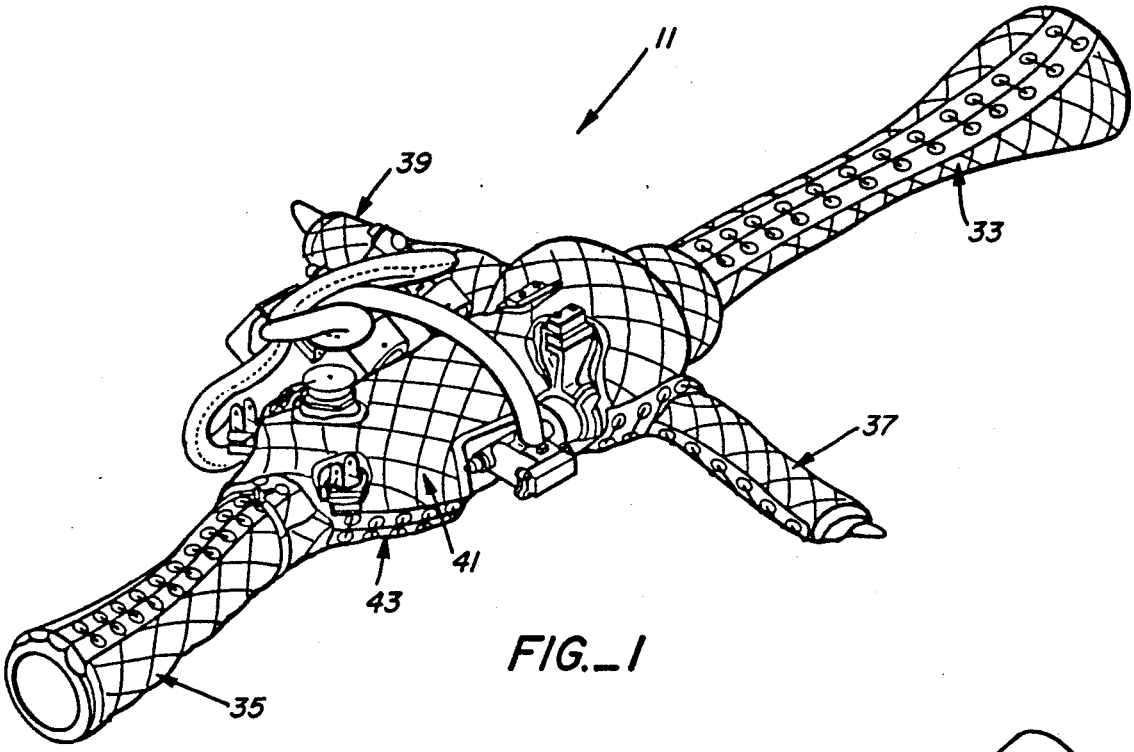
FIG. 1 is a pictorial view of an integrated valve assembly (IVA) showing a plurality of insulation quilt assemblies of the present invention wrapped around high temperature components.

Before proceeding with a more detailed description of the general configuration, the arrangement of insulation blankets, and other important features in the practice of this invention, the compositions of the important components will be provided.

The term "tantalum foil" as used herein refers to a foil of free metal tantalum of about one-half mil (0.0005 inches) thickness. Thicker or thinner foils and/or multiple foil layers can be used but one or more compromises or disadvantages in the manufacture or performances are encountered. Thicker foil inhibits flexibility and conformability and also adds weight, and thinner foil is more susceptible to tearing during the manufacturing process. The preferred tantalum foil meets AMS 7849 specifications.

The term "ceramic insulation blanket" as used herein refers to an insulation blanket made of alumina ($Al_2O_3$) and silica ($SiO_2$) typically about a 50/50 (+/−5) percent of each by weight. A suitable and preferred material is commercially available from the Carborundum Company sold under the trademark FIBERFRAX. The blanket is in the form of a ceramic non-woven fiber paper having the general appearance of a single-layer felt blanket. The blanket has a nominal thickness of about 0.12 inches when not compressed; the material has a nominal density of about 11 to 17 pounds per cubic foot. The applicable material specification is ASTM-C 167.

The term "silicic" as used herein means containing silicon or pertaining to silicon. For example the aminosilane binder mentioned below is a silicic material.

The term "quartz fabric" as used herein refers to a material preferably about 0.005 inches thick and comprises of silica ($SiO_2$) fibers with an aminosilane binder. The aminosilane is used for beneficial physical effects including the avoidance of fraying of the fibers and to make the material more flexible (in the nature of a secondary plasticizer). It is thus seen that the specific aminosilane used is not critical although aminosilane itself is preferred. A suitable material of this type is sold under the trademark ASTRO QUARTZ II by the J. P. Stevens Co. Where the foregoing fabric is used as the outermost (cooler side) covering of the outermost quilt, it is coated on the outside surface with silicone rubber meeting Federal Specification ZZ-R-765, Class 2A, Grade 50, at the rate of 2.5 to 3.5 fluid ounces per square yard, to improve handling characteristics.

The stitching together (i.e., quilting) of materials is done using a "quartz fiber thread" which is a continuous filament of high purity (i.e., 99.9% or more) silica ($SiO_2$), between 0.015 and 0.021 inches in diameter, with a polytetrafluoroethylene coating of about 16 to 26 percent by weight. Such thread meets ASTM-D 578 Thread Designation 300 2/2/3.

The term "case" as used herein refers to the quilt quartz-fabric envelope, and includes the fabric covering each side and the binding material around the edges.

The term "hot object" as used herein refers to an object, such as a gas-conducting component, having an exterior surface temperature as high as 3000° F. when in operation.

Figure 2:
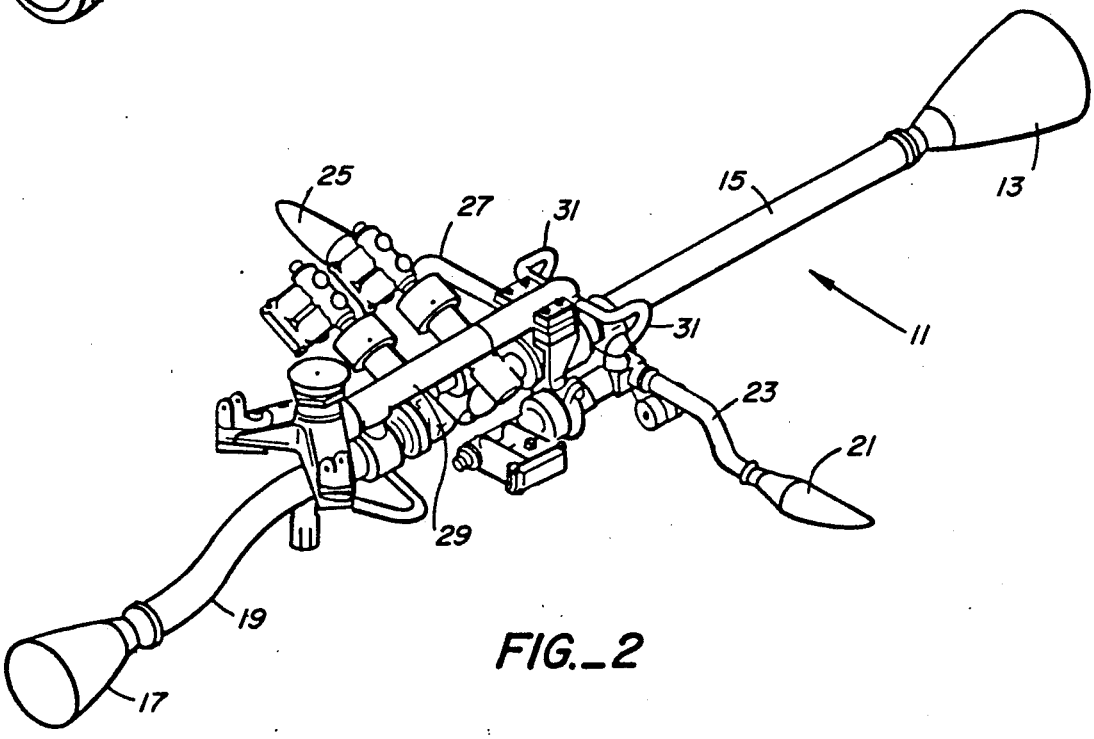
FIG. 2 is a pictorial view of the IVA of FIG. 1 that has not been covered by the insulation quilt assemblies of the present invention.

In FIG. 1 is shown the integrated valve assembly (IVA) 11 of FIG. 2 that has been wrapped with a plurality of insulation quilt assemblies 33, 35, 37, 39, 41, and 43, in order to reduce the heat transfer from the IVA 11 to nearby missile components. In FIG. 2 are shown various elements of IVA 11 including thrust nozzles 13 and 17, roll nozzles 21 and 25, blast tubes 15, 19, 23, and 27, main stage valves feed tube 29 and roll valve feed tubes 31. As shown in FIG. 1 the above elements of IVA 11 are covered with a plurality of insulation quilt assemblies including thrust nozzle quilt assemblies 33 and 35, roll nozzle quilt assemblies 37 and 39, and main body quilt assemblies 41 and 43. These quilt assemblies are configured so as to fit the components as illustrated.

Figure 4:
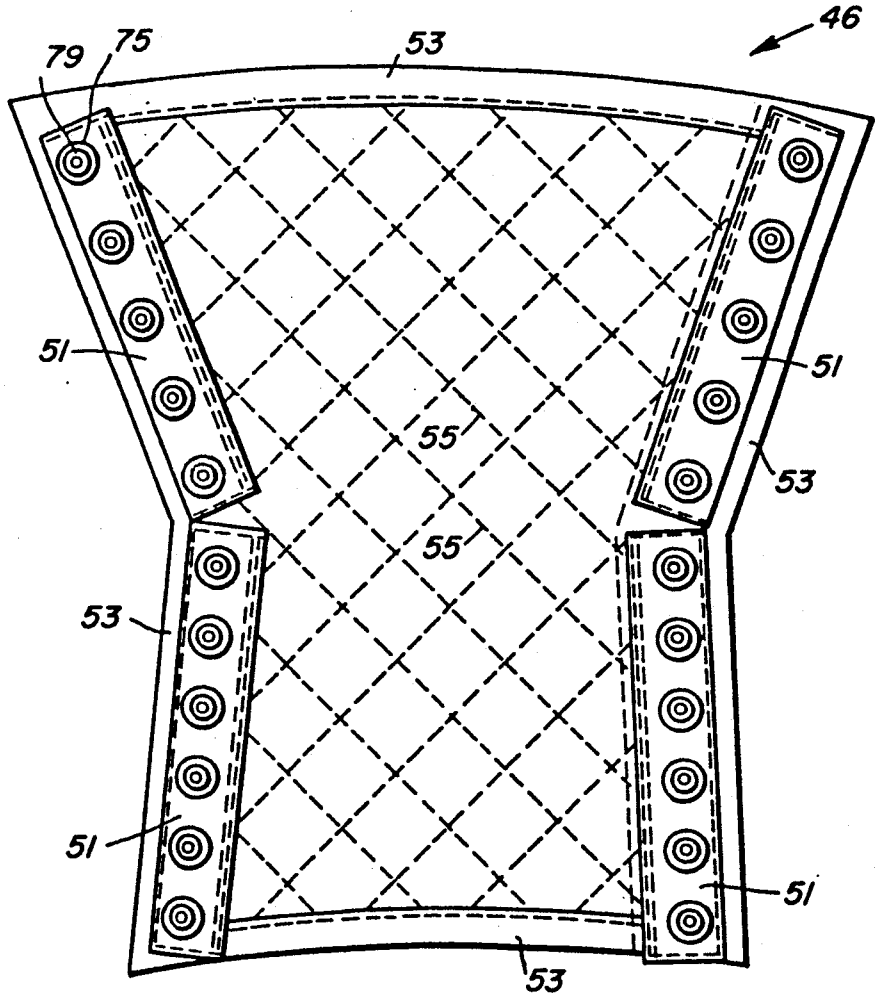
FIG. 4 is a development (i.e., unwrapped view) of an example of an outer quilt of the present invention, looking at its outermost (i.e., cooler)side.
Figure 3:
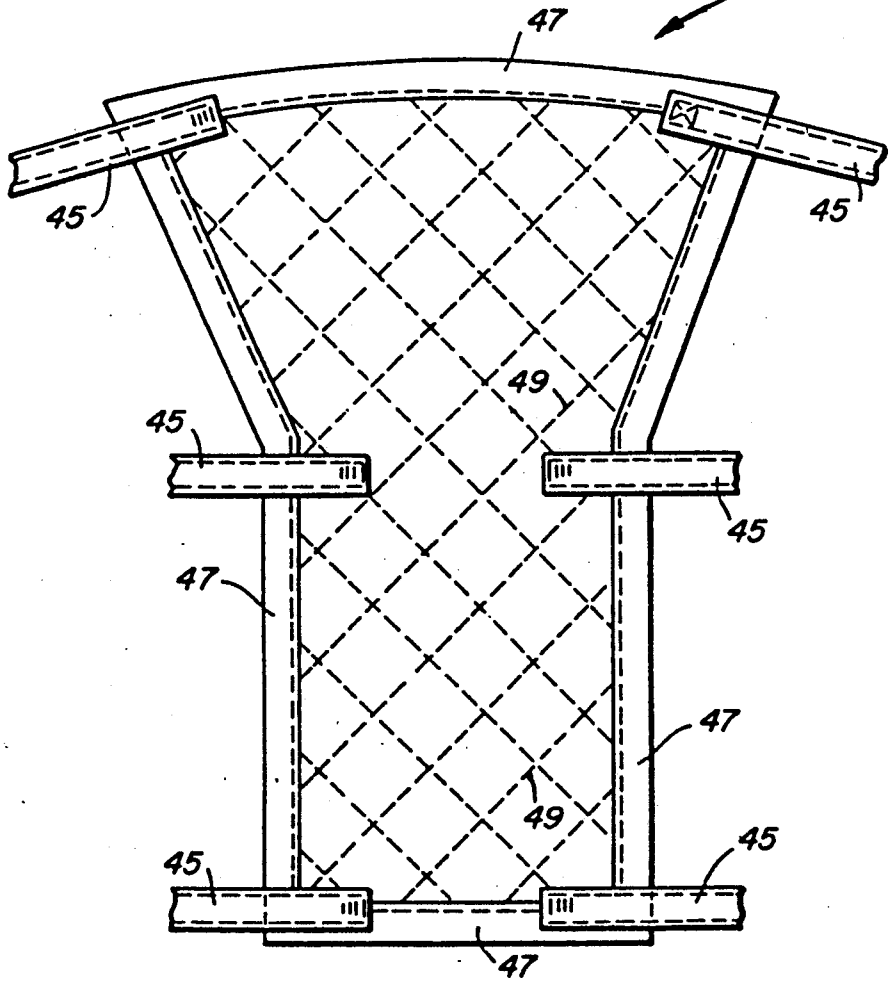
FIG. 3 is a development (i.e., unwrapped view) of an example of an inner quilt of the present invention, looking at its outermost (i.e., cooler)side.
Figure 5:
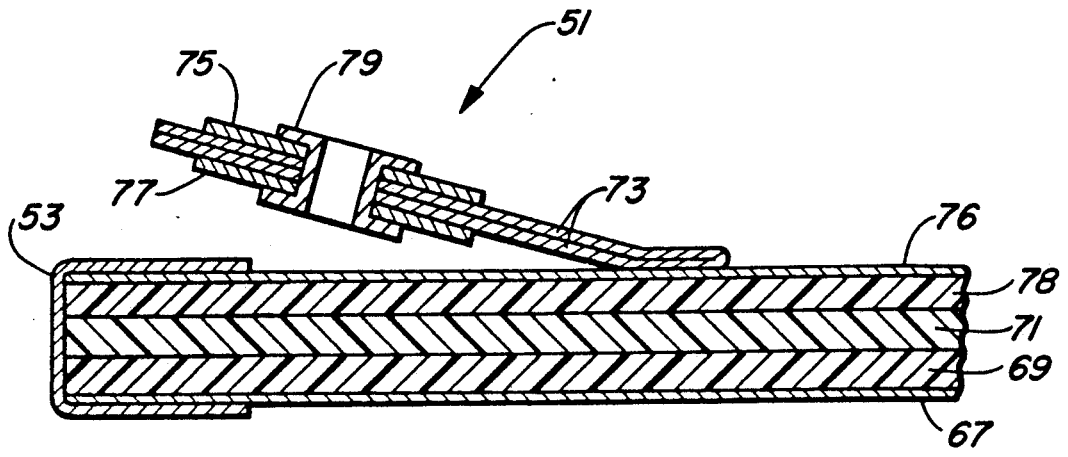
FIG. 5 is a cross-sectional view of the edge of an outer quilt showing the edge binding and lacing strips.

In FIGS. 3 and 4 thrust nozzle quilt assembly 33 is shown as a typical example. Thrust nozzle quilt assembly 33 is made up from thrust nozzle inner quilt 44 and thrust nozzle outer quilt 46 as shown respectively in FIGS. 3 and 4. Inner quilt 44 is shown as a flat developement (i.e., unwrapped view) in FIG. 3, and includes tie straps 45, edge binding material 47, and cross-stitching 49. Outer quilt 46 is shown as a flat development in FIG. 4, and includes lacing strips 51, edge binding material 53, and cross-stitching 55. As shown in FIG. 5 lacing strips 51 comprise a folded-over strip of quartz fabric 73 sewn to the quilt case material 76, circular quartz fabric washers 75 and 77 and metal grommets 79.

Figure 6:
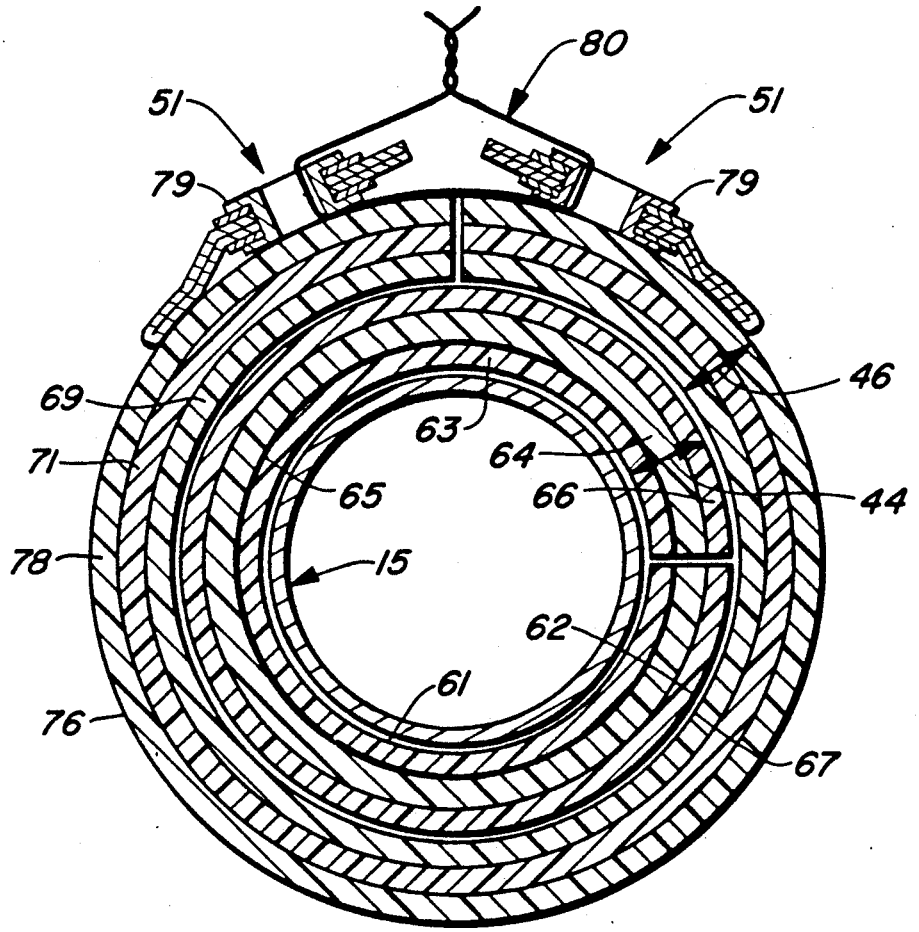
FIG. 6 is a typical cross section of an assembly of one inner and one outer thermal insulation quilt of the present invention, wrapped around a blast tube.

In FIG. 6 is shown a typical cross section of the inner and outer quilts wrapped, in this example, around the outside surface of blast tube 15. The inner quilt 44 includes quartz fabric 61 and 62, three blankets of ceramic insulation 63, 64, and 66, and tantalum foil 65. The outer quilt 46 includes quartz fabric 67, three blankets of ceramic insulation 69, 71, and 78, and silicone-rubber-coated quartz fabric 76. Edge binding material 47 of the inner quilt 44, and edge binding material 53 of the outer quilt 46 is not shown in FIG. 6. Lock wire 80 pulls two opposite metal grommets 79 of lacing strips 51 toward each other.

Quartz fabric is used because it can withstand high temperatures (over 3,000° F.) and has high strength to retain the ceramic insulation blankets and to protect them during installation and handling. Ceramic insulation is used because it has a very high melt temperature, low thermal conductivity, and low density. It should be noted that both the number and the thickness of the ceramic insulation blankets within the quilts can be varied to suit thermal insulation requirements.

The tantalum foil 65 is used as a thermal radiation barrier; it reduces the amount of heat radiating through the blankets of ceramic insulation external to it, thereby reducing heat transmission through the quilts.

In application, a flat inner quilt is placed against an object to be covered and manipulated so as to conform to that portion of the surface of the object from which the shape of the flat quilt was developed. If more than one inner quilt is required to cover the surface of the object the additional inner quilt(s) are then placed into proper adjacent position(s). Inner quilt(s) are held in position using sewn-on tie straps. Corresponding flat outer quilt(s) are then placed over the inner quilt(s) and similarly manipulated into position; care should be taken to ensure that inner and outer quilt seems do not coincide, thereby avoiding the occurrence of hot spots when the covered object is at operating temperature. The abutting edges of the inner quilt(s) (i.e., seams) should be positioned so that they will be forced together when the abutting edges of the outer quilt(s) are drawn tightly together and secured by wire looped through grommets in the sewn-on lacing strips of the outer quilt(s).

It is seen that the terminal insulation quilt assemblage of this invention provides a high temperature gradient from the hot object wrapped within to the outside surface of the outer insulation quilt. Thus the present thermal insulation quilt assemblage is highly effective in reducing high temperatures over a short distance. In missile applications, where much effort is expended to attain the goals of minimal weight and bulk, this invention provides a highly desirous solution to thermal insulation problems.

This invention has been described in detail with particular reference to a certain preferred embodiment, but it will be understood that variations and modifications can be effected within the spirit and scope of the invention.

That what is claimed is:

1. A thermal insulation quilt assemblage, comprising:

a flat inner quilt having an innermost side and an outermost side, said inner quilt disposed to fit over a surface of a hot object in contact with said innermost side;

a flat outer quilt having an innermost side and an outermost side, said outer quilt disposed to fit over said inner quilt with said innermost side of said outer quilt in contact with said outermost side of said inner quilt, said outermost side of said outer quilt coated with silicone rubber;

an inner-quilt quartz fabric case having bound edges, covering said inner quilt;

an outer-quilt quartz fabric case having bound edges, covering said outer quilt;

at least two ceramic insulation blankets included within said inner-quilt case;

at least two ceramic insulation blankets included within said outer-quilt case;

a tantalum foil inserted between two of said blankets included within said inner-quilt case;

holding means for holding said inner quilt in place on said hot object; and securing means for securing adjacent outer quilt edges together.

2. A thermal insulation quilt assemblage as recited in claim 1, wherein said securing means includes lacing strips sewn to said outermost side of said outer quilt near said edges, and wire looped between adjacent lacing strips.

3. A thermal insulation quilt assemblage as recited in claim 1, wherein at least three ceramic insulation blankets are included within said inner-quilt case.

4. A thermal insulation quilt assemblage as recited in claim 3, wherein said securing means includes lacing strips sewn to said outermost side of said outer quilt near said edges, and wire looped between adjacent lacing strips.

5. A thermal insulation quilt assemblage as recited in claim 3, wherein said tantalum foil is inserted between two blankets nearest said inner quilt innermost side.

6. A thermal insulation quilt assemblage as recited in claim 5, wherein said securing means includes lacing strips sewn to said outermost side of said outer quilt near said edges, and wire looped between adjacent lacing strips.

7. A method for insulating hot objects, comprising the steps of:

placing a flat inner quilt having an innermost side and an outermost side against a hot object on said innermost side;

manipulating said inner quilt to conform to the surface of said hot object;

holding said inner quilt in place on the surface of said object;

placing a flat outer quilt having an innermost side and an outermost side over said inner quilt;

manipulating said outer quilt to conform to the surface of said inner quilt; and securing said outer quilt in place.

8. A method for insulating hot objects as recited in claim 7, wherein said inner quilt and said outer quilt each include a quartz fabric case having bound edges, and including within each case at least two ceramic insulation blankets, said inner quilt case further including a tantalum foil inserted between two of said blankets.

9. A method for insulating hot objects as recited in claim 7, wherein said outer quilt includes a quartz fabric case having bound edges and including within at least two ceramic insulation blankets, and said inner quilt includes a quartz fabric case having bound edges and including within at least three ceramic insulation blankets and further including a tantalum foil inserted between two blankets nearest said inner quilt innermost side.

* * * * *